United States Patent [19]

Schaefer et al.

[11] 4,068,452
[45] Jan. 17, 1978

[54] MOWER SPINDLE AND SPINDLE DRIVE BELT BRAKING ARRANGEMENT FOR ROTARY MOWER HAVING PLURALITY OF MOWER SPINDLES

[75] Inventors: Daniel W. Schaefer; Kenneth H. Klas, both of Port Washington, Wis.

[73] Assignee: Allis-Chalmers Corporation, Milwaukee, Wis.

[21] Appl. No.: 666,046

[22] Filed: Mar. 11, 1976

[51] Int. Cl.[2] .................... A01D 69/08; A01D 69/10
[52] U.S. Cl. ........................................ 56/11.6; 192/11
[58] Field of Search ................... 56/6, 10.2, 10.5, 10.8, 56/11.3, 11.4, 11.5, 11.6, 13.5, 13.6, 13.7; 192/11

[56] References Cited

U.S. PATENT DOCUMENTS

| | | | |
|---|---|---|---|
| 2,718,154 | 9/1955 | Mathson | 192/11 X |
| 2,899,793 | 8/1959 | Swisher | 56/11.6 |
| 3,229,452 | 1/1966 | Hasenbank | 56/10.5 |
| 3,367,459 | 2/1968 | Rubin | 192/11 |
| 3,460,325 | 8/1969 | Musgrava | 56/11.6 |
| 3,543,892 | 12/1970 | DeBaillie | 192/11 |
| 3,570,637 | 3/1971 | Pitman et al. | 192/11 |
| 3,590,564 | 7/1971 | Clifford | 56/10.2 |

*Primary Examiner*—Russell R. Kinsey
*Attorney, Agent, or Firm*—Robert C. Sullivan

[57] ABSTRACT

A braking arrangement for use with rotary mowers of the type comprising a pair of spaced apart arbors, each supporting for rotation a spindle having a mower blade mounted on the lower end thereof. A driven pulley is secured to the upper end of each spindle. The two driven pulleys are driven by a common drive belt. An idle pulley is movable either into tensioning or nontensioning relation to the drive belt to cause said belt to be in either driving or nondriving relation to the driven pulleys. To prevent coasting of the two mower blades and of the drive belt upon movement of the idler pulley to a nontensioning position, a rod-like pivoted brake member is provided which has a common braking cooperation with both driven pulleys. A biasing spring constantly urges the brake member toward braking position. A nonadjustable disabling link moves with movement of the idler pulley support arm so that when the idler pulley is moved to belt tensioning position the disabling link pivotally moves the brake member against the force of its biasing spring to a nonbraking position. When the idler pulley and the drive belt are moved to untensioned position, the disabling link is moved to a position in which the biasing spring is free to move the brake member into simultaneous braking engagement with both driven pulleys to prevent coasting of both mower blades, and also to bring the drive belt to a stop.

14 Claims, 6 Drawing Figures

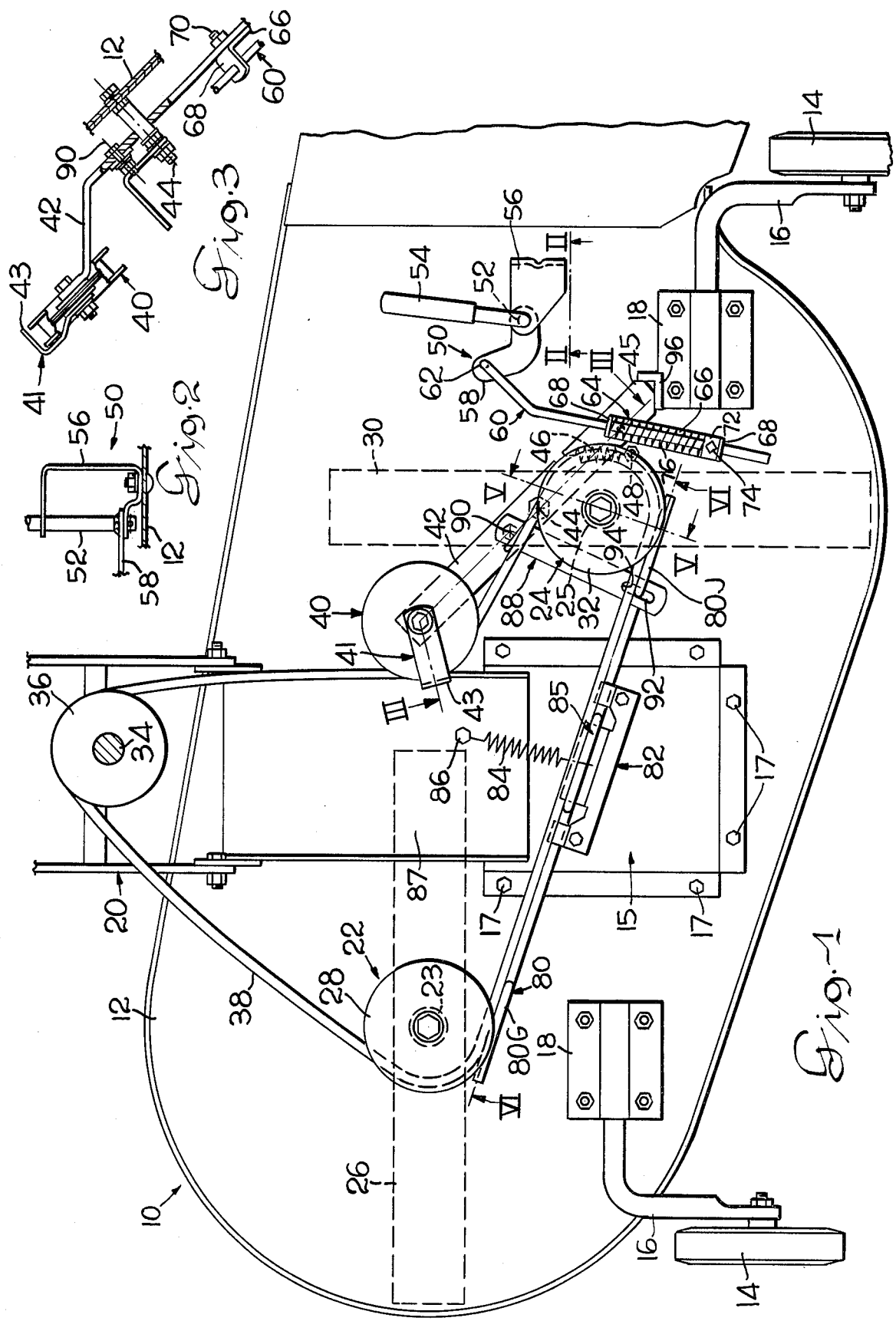

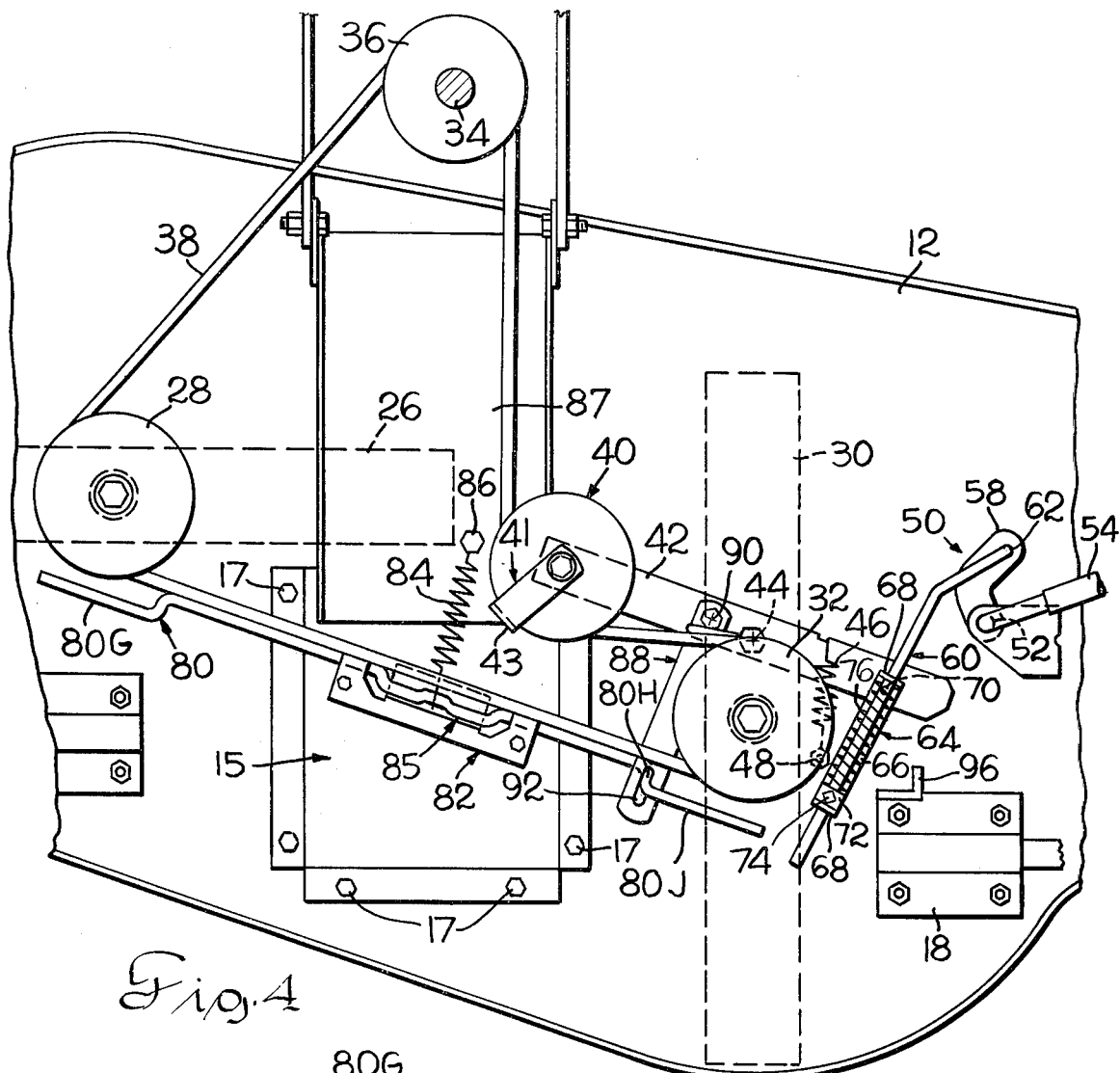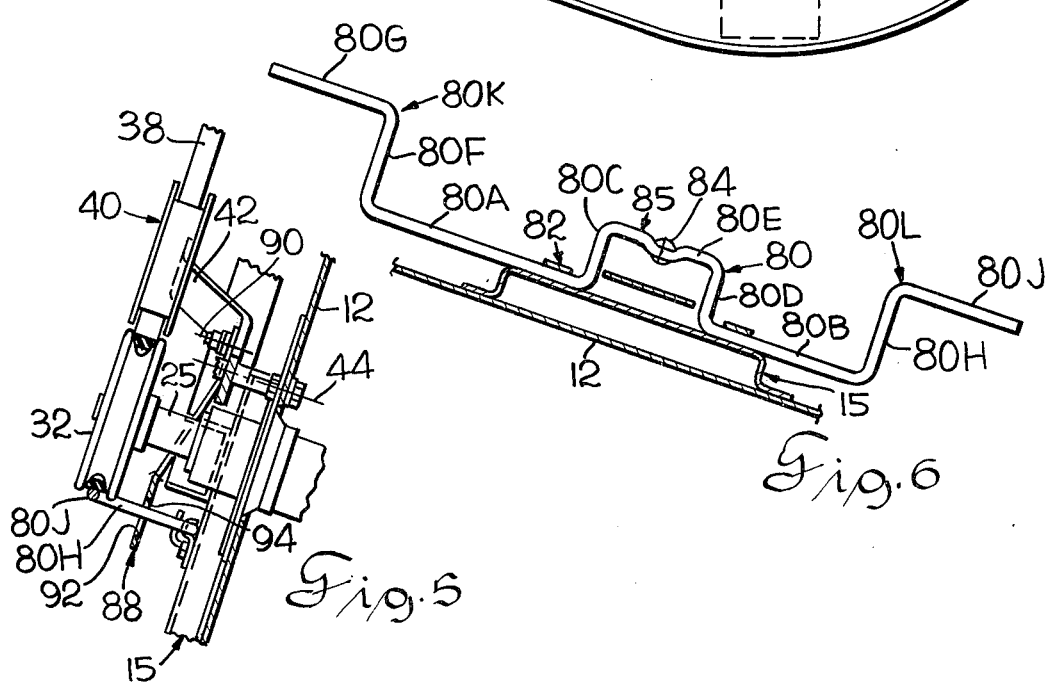

MOWER SPINDLE AND SPINDLE DRIVE BELT BRAKING ARRANGEMENT FOR ROTARY MOWER HAVING PLURALITY OF MOWER SPINDLES

BACKGROUND OF THE INVENTION

1 Field of the Invention

This invention relates to rotary mowers of the type having a plurality of belt-driven mower blade supporting spindles, such as two blade supporting spindles for example, and to a braking arrangement for rapidly stopping any coasting movement of the plurality of blade supporting spindles and also for stopping coasting of the drive belt, when the connection of the mower spindles to the source of driving power therefor has been interrupted as by detensioning the drive belt by the belt detensioning operation.

2. Description of the Prior Art

In the prior art, as exemplified, for example by U.S. Pat. No. 3,460,325, issued to O. Musgrave on Aug. 12, 1969, where it has been desired to apply a braking force to two mower spindles, it has been known to use two separate and distinct pivotal braking members which respectively provide braking action on the two different spindles, these two separate and distinct braking members being suitably connected through suitable links and levers to the operating lever for the drive belt idler.

The various braking arrangements provided in the prior art for applying a braking action to a plurality (such as two), mower spindles also have various disadvantages such as increased manufacturing cost as compared to the construction of the present invention, and the need for periodic adjustment, both of which disadvantages it is an object of the present invention to overcome.

STATEMENT OF THE INVENTION

Accordingly, it is an object of the present invention to provide an improved mower spindle and drive belt braking arrangement for use with a rotary mower of the type having a plurality (such as two) mower spindles, which braking arrangement is lower in manufacturing cost than prior art arrangements and uses few and inexpensive parts which substantially never need adjustment.

It is another object of the invention to provide a mower spindle braking arrangement for use with a rotary mower of the type having a plurality (such as two) mower spindles, in which a single brake member movable about a single pivot support is effective to simultaneously apply a braking action to the plurality of mower spindles.

It is a further object of the invention to provide a mower spindle braking arrangement for use with a rotary power mower of the type having a plurality (such as two) blade supporting mower spindles, in which the braking arrangement is capable of stopping coasting of the mower blades, and also to stop coasting of the mower spindle drive belt, in a very short time, such as less than six seconds, after the drive belt for the mower spindles has been declutched out of driving relation to the mower spindles.

It is a further object of the invention to provide a mower spindle braking arrangement for use with a rotary power mower of the type having a plurality (such as two) mower blade supporting spindles, which arrangement provides a more simplified and less expensive arrangement for stopping coasting of the mower blades, and also for stopping coasting of the mower blades, and also for stopping coasting of the mower spindle drive belt, when the driving power of the mower blade spindles has been declutched, as compared to prior art arrangements for accomplishing the same purpose.

It is still a further object of the invention to provide a braking arrangement for a mower spindle drive belt and the mower spindles driven thereby including a lost-motion connection between a brake disabling link or lever and a pivoted brake member which insures that the brake member can always move to fully braking position under the influence of a biasing spring when the drive belt is in untensioned condition without the necessity of any adjustment of the brake disabling link over the entire range of tolerances or of dimensional changes of the mower spindle drive belt, and over the entire range of manufacturing tolerances of the various parts of the belt clutching and brake operating mechanism.

BRIEF DESCRIPTION OF THE DRAWINGS

Further objects and advantages of the invention will become apparent from the following description taken in conjunction with the accompanying drawings in which:

FIG. 1 is a top plan view, with protective cover removed, showing a rotary power mower having two belt-driven blade supporting spindles, together with the braking arrangement of the present invention shown in its braking position;

FIG. 2 is a view taken substantially along line II—II of FIG. 1;

FIG. 3 is a view taken substantially along the section line III—III of FIG. 1;

FIG. 4 is a top plan view of the rotary mower with protective cover removed, generally similar to FIG. 1, except that the idler pulley for the spindle drive belt is shown in its belt-tensioning position, and with the braking mechanism of the invention being shown in its non-braking position;

FIG. 5 is a view taken along section line V—V of FIG. 1; and

FIG. 6 is a view taken substantially along line VI—VI of FIG. 1.

DESCRIPTION OF THE PREFERRED EMBODIMENT

Referring now to the drawings and more particularly to FIG. 1, there is shown a rotary mower assembly generally indicated at 10 of the type adapted to be supported in an underslung fashion by ride-on tractor mower, although the invention to be described hereinafter is not restricted in any manner to use with mowers of the underslung type just mentioned. The mower generally indicated at 10 comprises a mower deck 12 which is supported at its forward end for motion along the ground by wheels 14. Wheels 14 are suitably supported for rotation by bearing bracket arms 16 which, in turn, are suitably secured to the upper surface of the forward end of mower deck 12 by bracket members 18. The mower 10 is suitably supported by the ride-on tractor by support means generally indicated at 20 in a manner well known in the art.

Rotary mower 10 is of the type having two separate mower blades mounted on separate spindles in spaced-apart relation to each other and beneath the mower deck 12 and in cutting relation to the grass. Thus, for this purpose there is provided a first arbor assembly generally indicated at 22 suitably mounted on mower deck 12 at which might be described as the left-hand side of the mower deck 12 relative to the view of FIG. 1, and a second arbor assembly generally indicated at 24 suitably mounted on mower deck 12 at what might be described as the right-hand side of mower deck 12. Arbor assembly 22 includes a vertical spindle 23 suitably supported for rotation by arbor assembly 22, spindle 23 projecting below the surface of deck 12 to support thereon for rotation with spindle 23 a mower blade 26. The portion of rotatable spindle 23 which projects above the surface of mower deck 12 has fixed thereto a grooved pulley 28, whereby rotation of pulley 28 by means of the belt drive to be described causes rotation of the vertical spindle 23 of arbor assembly 22 and, consequently, causes rotation of mower blade 26 which is mounted on vertical spindle 23 beneath the level of mower deck 12.

In a similar manner, arbor assembly 24 which is mounted on the right-hand portion of mower deck 12 relative to the view of FIG. 1 includes a vertical spindle 25 which is suitably supported for rotation by arbor assembly 24 and which includes a spindle portion extending beneath the level of mower deck 12 and having mounted thereon a mower blade 30 which rotates with the spindle 25. A portion of rotatable spindle 25 of arbor 24 projects above the level of mower deck 12 and has fixed thereto a grooved pulley 32 which is engageable with drive belt 38 to be described.

A drive shaft 34 which may be part of the power takeoff mechanism of the ride-on tractor with which the particular rotary mower 10 in the illustrated embodiment is associated, has fixed thereto a groove drive pulley 36. The particular manner in which drive shaft 34 is driven to rotatably drive the spindles 23 and 25 of the respective arbors 22 and 24 forms no part of this invention.

A drive belt 38 of the "V" type is trained around grooved drive pulley 36 and around grooved driven pulleys 28 and 32 attached to the respective spindles 23 and 25.

In accordance with the well-known practice relating to the art of belt-driven pulleys, an idler pulley generally indicated at 40 is provided for controlling the tension on V-belt 38 in such manner that the idler pulley 40 may tension the drive belt 38 in one position of the idler pulley, as shown in FIG. 4 for example, whereby to provide a driving engagement between the drive pulley 36 and the driven pulleys 28 and 32; or, alternatively, idler pulley 40 may be moved to the position shown in FIG. 1 in which it releases the tension on drive belt 38 so that drive pulley 36 is no longer in driving relation to driven pulleys 28 and 32.

Idler pulley 40 is rotatably mounted at the outer end of an idler pulley support arm 42 which is mounted for pivotal movement in a horizontal plane on a vertical stud 44 which is itself suitably secured to the mower deck 12.

In order to retain drive belt 38 in close proximity to idler pulley 40, particularly when the idler pulley is in the untensioned belt position of FIG. 1, a belt-retaining clip generally indicated at 41 is mounted on the outer end of idler pulley support arm 42 about the same pivotal axis as idler pulley 40. Belt-retaining clip includes a downwardly bent portion 43 which serves to retain drive belt 38 in close proximity to idler pulley 40.

A relatively weak biasing spring 46 is connected to a point on idler pulley support arm 42 on a side of the pivot point 44 of arm 42 opposite that on which idler pulley 40 is located in such manner that biasing spring 46 causes end 45 of idler pulley support arm 42 to exert a downward force on an electrical interlock switch 96 when arm 42 is in the FIG. 1 position, as will be explained in more detail hereinafter. The end of biasing spring 46 opposite the end which is attached to idler pulley support arm 42 is suitably anchored at point 48 on the mower deck 12.

Motion is imparted to idler pulley support arm 42 whereby to move idler pulley 40 either to the drive belt untensioned position of FIG. 1 or to the position in which the drive belt 38 is tensioned, as seen in FIG. 4, by means of a clutch lever assembly generally indicated at 50. Clutch lever assembly 50 comprises a vertical rod 52 (FIG. 2) having at its upper end a generally horizontally extending handle portion 54 (FIGS. 1 and 4) to facilitate manual rotation of vertical shaft 52. As best seen in FIG. 2, shaft 52 of the clutch lever assembly 50 is mounted for rotary movement about a vertical axis in a vertically extending support bracket member 56 which is suitably secured to the mower deck 12. A bell crank 58 is rigidly secured as by welding to the lower end of vertical rod 52 of clutch lever assembly 50.

The motion of clutch lever assembly 50 is transmitted to idler pulley support arm 42 whereby to shift the idler pulley selectively from the FIG. 1 position to the FIG. 4 position, or vice versa, by means of a rod-like member generally indicated at 60 which is pivotally connected at one end thereof to bell crank 58 at point 62. The operating rod 60 connected to bell crank 58 cooperates with a U-shaped bracket member generally indicated at 64 having a longitudinally extending base wall member 66 (FIGS. 1, 3, 4) and oppositely disposed end wall members each indicated at 68 and each extending perpendicularly to base wall member 66. U-shaped bracket member 64 is pivotally connected to idler support arm 42 contiguous the outer free end of idler support arm 42 by means of a stud member 70 (FIG. 3) which is rigidly connected to base wall 66 of U-shaped bracket member 64, stud member 70 passing through an aperture in idler pulley support arm 42 to pivotally connect U-shaped bracket member 64 to idler pulley support arm 42. Operating rod 60 which is connected to bell crank 58 of clutch lever assembly 50 extends through a suitable aperture in each of the opposite end walls 68 of U-shaped bracket 64, rod 60 extending for the entire length of bracket 64 and projecting beyond the end wall 68 of bracket 64 closest to the forward end of mower deck 12. Operating rod 60 also passes through a block member 72 received within bracket 64, block member being held in a fixed position on rod 60 by means of a set screw 74. A helical spring 76 surrounds the portion of rod 60 which is disposed within U-shaped bracket member 64, one end of helical spring 76 abutting against the face of block 72 while the other end of the spring 76 abuts against the inner face of the opposite end wall 68 of bracket 64.

It can be seen that if clutch lever assembly arm 54 is rotated in a clockwise direction from the FIG. 1 position corresponding to the untensioned condition of belt 38, the clockwise movement of bell crank 58 will first cause a linear movement of connecting rod 60 which will cause block 72 attached to rod 60 and moving in the U-shaped bracket member 64 to compress helical spring 76 in bracket 64 until a point is reached at which the force of spring 76 against the end wall 68 of the bracket closest to the idler pulley support arm 42 will, due to the connection of bracket 64 to arm 42, cause a movement of idler pulley support arm 42 to the belt tensioning position of FIG. 4. In other words, during the movement of idler pulley 40 to the belt tensioning position of FIG. 4, the force of clutch lever assembly 50 is transmitted to idler pulley support arm 42 through the medium of the compressed force of spring 76 caused by the motion of block 72 mounted on rod 60, rather than by a direct mechanical connection of rod 60 to idler pulley support arm 42. However, such is not the case during the reverse movement or counterclockwise movement of clutch assembly 50, relative to FIGS. 1 and 4 as from the belt tensioned position of FIG. 4 to the belt untensioned position of FIG. 1, since in this latter case, block 72 within U-shaped bracket member 64 bears directly against end wall 68 of U-shaped bracket 64 as seen in FIG. 1 and directly transmits the force of operating rod 60 to idler pulley support arm 42 to move the idler pulley support arm to the untensioned position of FIG. 1.

When idler pulley support arm 42 is moved to the untensioned position, as seen in the view of FIG. 1, in which idler pulley 40 at the completion of the untensioning movement of idler pulley 40 is so positioned that drive belt 38 is no longer in driving relation to driven pulleys 28 and 32 of the mower blade supporting spindles 23 and 25, it is important that rotation of both of the blade supporting spindles 23 and 25 of the respective mower blades 26 and 30 carried thereby be stopped as promptly as possible. As idler pulley 40 begins to move from the FIG. 4 (belt tensioned) toward the FIG. 1 (belt untensioned) position drive belt 38 still continues to rotate in driving relation to pulley spindles 23 and 25 during the initial phase of the belt detensioning operation, and the drive belt 38 does not tend to stop its driving relation to driven pulleys 28 and 32 until approximately the time of initial contact of the brake member 80 (to be described hereinafter) with drive belt 38. At about the moment of initial contact of brake 80 with drive belt 38, drive belt 38 discontinues its driving relation to pulleys 28 and 32, belt 38 then beginning to coast. It is therefore important that during appropriate portions of the period of movement of idler pulley 40 from the FIG. 4 (belt tensioned) to the FIG. 1 (belt untensioned) position, brake member 80 performs a braking operation to prevent the coasting not only of pulley spindles 23 and 25, but also to prevent coasting of drive belt 38.

In accordance with the present invention, these objectives, namely the braking of the coasting drive belt 38 and also the stopping of the coasting rotation of mower blade supporting spindles 23 and 25 is achieved in the following manner:

A brake rod generally indicated at 80, as best seen in detail in FIG. 6, is mounted on the upper surface of a platform generally indicated at 15, which is secured by suitable fastening means 17 to the upper surface of mower deck 12. The purpose of platform 15 is to raise brake rod 80 to a proper horizontal level for cooperation with the drive belt 38 and driven pulleys 28 and 32. Brake rod 80 extends from contiguous pulley 28 of the arbor assembly 22 to adjacent pulley 32 of arbor assembly 24. Brake rod 80 in the illustrated embodiment is one continuous rod member having two straight portions 80A and 80B which are adapted to rest on the upper surface of platform 15 and which extend through suitable passages in a pivot bracket generally indicated at 82 mounted on platform 15, pivot bracket 82 supporting brake rod 80 for pivotal movement substantially about a horizontal axis. Brake rod 80 also includes a central brake-like portion generally indicated at 85 including two axially spaced bent leg portions 80C and 80D which lie in a common plane with and parallel to each other and which are bent at substantially a perpendicular relation to horizontal rod portions 80A and 80B. The upper ends (relative to FIG. 6) of the perpendicular rod portions 80C and 80D of brake rod 80 are provided with a connecting portion indicated at 80E connecting the corresponding opposite outer ends of the bent portions 80C and 80D, connecting portion 80E extending in a substantially horizontal plane which is parallel to the plane of the brake rod portions 80A, 80B. It can be seen that the spaced parallel brake rod portions 80C and 80D together with the connecting portion 80E define a crank-like element located substantially centrally of the length of brake rod 80. The opposite outer ends of the respective rod portions 80A and 80b are each bent into an L-shaped configuration respectively generally indicated at 80K and 80L. The L-shaped configuration indicated at 80K includes a leg portion 80F which is bent substantially perpendicularly to the end of horizontal brake rod portion 80A and a horizontal arm portion 80G which is bent substantially perpendicularly to the upper end (relative to the view of FIG. 6) of leg portion 80F.

At the opposite end of brake rod 80, the L-shaped configuration generally indicated at 80L includes a leg portion 80H which is bent substantially perpendicularly to the outer end of horizontal brake rod portion 80B and an arm 80J which is bent substantially perpendicularly to the upper end (relative to the view of FIG. 6) of leg portion 80H so as to extend horizontally and substantially in axial alignment with the corresponding oppositely disposed arm 80G.

As will be explained in more detail hereinafter, the horizontally extending arm portions 80G and 80J at the opposite ends of brake rod 80 constitute the braking arms of brake rod 80 which engage the "V" drive belt 38 (FIG. 1) during the transition from the FIG. 4 position to the FIG. 1 position (i.e. from the belt tensioned to the belt untensioned position) to exert a braking action on belt 38 to stop coasting rotation of belt 38, and also, in the later phase of the braking process, to wedgingly engage the untensioned V-belt 38 with the grooves of the respective pulleys 28 and 32 of the respective arbor assemblies 22, 24 to thereby exert a braking action on the coasting pulleys 28 and 32 whereby to rapidly and substantially simultaneously stop the coasting action of the mower blade carrying spindles 23 and 25 attached to the respective pulleys 28 and 32.

As best seen in FIGS. 1, 4, and 6, a biasing spring 84 is anchored at one end to the mid-point of the cross-portion 80E of the "crank" portion of brake rod 80 (the crank portion being defined by the portions 80C, 80D and 80E of the brake rod 80), the opposite end of spring 84 being suitably anchored at a point 86 (FIGS. 1 and 4) on a surface 87 which is elevated a short distance above the surface of mower deck 12. It will be seen that biasing spring 84 normally tends to bias brake rod 80 to the braking position shown in FIG. 1 of the drawings.

In accordance with an important feature of the construction a control link means is provided in accordance with the invention for disabling or rendering ineffective the brake rod 80 (and more specifically the brake arms 80G and 80J carried by brake rod 80) from performing its braking action when idler pulley 40 is in its activated position shown in FIG. 4 in which idler pulley 40 is tensioning drive belt 38 and causing drive belt 38 to communicate the driving action of pulley 36 to driven pulleys 28 and 32. This disabling arrangement comprises a brake lever or disabling lever member generally indicated at 88 which is pivotally connected at one of its ends at point 90 to idler pulley support arm 42. Pivot point 90 of disabling lever 88 to idler pulley support arm 42 lies on the same side of the pivotal axis 44 of arm 42 as does idler pulley 40. The opposite end of disabling lever member 88 is adapted to cooperate with brake rod 80 through a lost-motion connection in the form of an elongated slot 92 in disabling lever member 88 which receives leg 80H of brake rod 80. The end of slot 92 closest to pivot point 90 of disabling lever 88 is designated as 94.

The provision of a lost-motion connection between lever 88 and brake rod 80 has important operating advantages as compared to a fixed (i.e. not slotted) connection between disabling lever 88 and brake rod 80. The slot 92 in disabling lever 88 is made sufficiently long to insure that the brake member 80 (and more specifically brake arms 80G and 80J) can always move to fully braking position under the influence of biasing spring 84 when drive belt 38 is in the untensioned condition (the FIG. 1 position) without the necessity of any adjustment of the disabling lever or link 88 over the entire range of drive belt tolerances and also dimensional changes of the drive belt, and also over the entire range of dimensional manufacturing tolerances of the various parts of the belt clutching and brake operating mechanism.

It can be seen that in moving from the belt untensioned position of FIG. 1 to the belt tensioned position of FIG. 4, lever 54 of clutch lever assembly 50 is moved in a clockwise direction (relative to FIG. 1), causing idler pulley support art 42 to move in a counterclockwise direction about pivot point 44 of pulley support arm 42. In the beginning of the movement toward the FIG. 4 position, leg 80H of brake rod 80 lies intermediate the length of the lost-motion slot 92 in disabling lever or link 88, end 94 of slot 92 lying beyond brake leg 80H in the direction of the rear of the mower deck. (See FIG. 1 position.) Hence, in the movement of idler pulley 40, idler pulley support arm 42 and disabling lever or link 88 toward the FIG. 4 (belt tensioned) position, there is a certain amount of lost-motion of disabling lever 88 relative to brake rod leg 80H before end 94 of slot 92 in lever 88 abuts against leg 80H of brake rod 80. Once slot end 94 of disabling lever 88 has moved into abutting relation to leg 80H of brake rod 80, further counterclockwise movement of idler pulley support arm 42 in approaching the FIG. 4 (belt tensioned) position will cause the engagement of slot end 94 of disabling lever 88 with brake rod leg 80H to swing brake rod 80 about its pivotal support 82, against the biasing force of spring 84, brake rod ultimately reaching the position shown in FIG. 4 in which brake arms 80G and 80J of brake rod 80 are completely disengaged from drive belt 38, and hence in the FIG. 4 position, corresponding to the tensioned condition of drive belt 38, the disabling lever or link 88 has moved to a position in which it completely disables brake rod 80, and brake arms 80G and 80J thereof, from performing any braking function.

Conversely, it can be seen that in moving from the belt tensioned position of FIG. 4 to the belt untensioned position of FIG. 1, lever 54 of clutch lever assembly 50 is moved in a counterclockwise direction (relative to FIG. 4) causing idler pulley support arm 42 to move in a clockwise direction about its pivot point 44. As the idler pulley support arm 42 begins to move in a clockwise direction from the FIG. 4 (belt tensioned) position to approach the FIG. 1 (belt untensioned) position, disabling lever 88 moves with idler pulley support arm 42. During the initial phase of movement of disabling link 88 from the FIG. 4 to the FIG. 1 position, the accompanying movement of disabling lever 88 will permit brake rod 80 to move about its pivotal support 82 so as to cause brake arm portions 80G and 80J of brake rod 80 to approach toward a braking relation with drive belt 38. During this interval, until brake arm portions actually brakingly engage drive belt 38, there is still some driving action of belt 38 relative to driven pulleys 28 and 32, despite the fact that the clockwise movement of idler pulley 40 is beginning to detension belt 38. Also during this same interval in the initial movement from the FIG. 4 (belt tensioned) to the FIG. 1 (belt untensioned) position, the tension of biasing spring 84 acting on brake rod 80 continues to maintain arm 80H of brake rod 80 in abutting contact with end 94 of lost-motion slot 92 of the moving brake disabling lever 88, until brake arms 80G and 80J actually engage drive belt 38.

At about substantially the same moment in the movement from the FIG. 4 to the FIG. 1 position at which brake arms 80G and 80J initially contact belt 38, the clockwise movement of idler pulley support arm 42 and of idler pulley 40 supported thereby toward the untensioned position of FIG. 1 has been such that belt 38 is sufficiently untensioned that it is no longer in driving relation to pulleys 28 and 32, although belt 38 will have a tendency to continue to coast and mower blade supporting spindles 23 and 25 are also coasting. The engagement of brake arms 80G and 80J with the coasting (and now nondriving) belt 38 will brake the coasting of belt 38.

During the belt detensioning movement from the FIG. 4 to the FIG. 1 position, after brake arms 80G and 80J contact belt 38 and begin to exert a braking influence on belt 38 to brake the coasting of belt 38, the pivotal idler pulley support art 40 continues to rotate under the influence of clutch lever assembly 50 in a clockwise direction relative to FIGS. 1 and 4 about the pivotal connection 44 of arm 42, in so doing further loosening belt 38 although the driving relation of belt 38 to pulleys 28 and 32 has already been interrupted as previously explained. Under the influence of the motion imparted by clutch lever assembly 50, idler pulley support arm 42 finally reaches the position shown in FIG. 1. During the additional increment of angular movement of idler pulley support arm 42 and of idler pulley 40 supported thereby after brake arms 80G and 80J have made initial contact with drive belt 38, brake disabling lever or link 88 continues to move with idler pulley support arm 42, and in so doing, end 94 of lost-motion slot 92 in link 88 moves beyond and out of abutting contact with leg 80H of brake rod 80 to approach the position shown in FIG. 1 in which leg 80H of brake rod 80 lies intermediate the length of lost-motion slot 92. In this position (FIG. 1) of leg 80H of brake rod 80 intermediate the length of lost-motion slot 92, biasing spring 84 can pull brake rod 80 including brake arms 80G and 80J into full and maximum braking engagement with belt 38, forcing the V-shaped belt 38 into wedging braking engagement with the pulley grooves of the respective pulleys 28 and 32, whereby the frictional engagement of belt 38 with pulleys 28 and 32 under the influence of the spring-biased brake rod 80 will rapidly bring to a stop any coasting movement of either belt 38 or of the pulleys 28 and 32 attached to mower blade supporting spindles 23 and 25.

It will be noted in FIG. 1 that when idler pulley support arm 42 has reached its limiting position in its clockwise detensioning movement that the end 45 of arm 42 opposite the end of arm 42 which supports idler pulley 40 strikes a spring-loaded electric switch 96 connected in an electrical interlock circuit associated with the electrical starting circuit of the internal combustion engine propulsion system of the ride-on tractor which supports mower 10, in such manner as to permit starting of the tractor propulsion system only when the mower blade belt drive arrangement is in the untensioned or nondrive arrangement shown in FIG. 1. Biasing spring 46, which need be only a relatively weak spring, acts on arm 42 to cause the end of arm 42 to exert sufficient pressure on spring loaded interlock switch 96 to properly activate switch 18 to permit starting of the ride-on tractor.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A rotary mower comprising a mower deck, a pair of arbors mounted on said deck in spaced-apart relation to each other, a spindle supported for rotation by each of said arbors, a mower blade mounted on each of said spindles for rotation with the respective spindle in a plane beneath said mower deck, a driven pulley fixed to each spindle above said mower deck, a drive belt driven from a suitable drive source, each of said driven pulleys being adapted to have said drive belt trained therearound, an idler pulley support arm supported for movement by said mower deck, an idler pulley carried by said idler pulley support arm, a clutch lever means carried by said mower and operatively associated with said idler pulley support arm, said clutch lever means being selectively movable to move said idler pulley support arm to one or the other of two alternative positions, whereby to selectively move said idler pulley into either tensioning or nontensioning relation to said drive belt and thus whereby to cause said drive belt to be selectively either in driving or in non-driving relation to said driven pulleys, a brake member common to both of said driven pulleys and supported by said mower in proximity to and extending between both of said driven pulleys, said brake member having contiguous each of its opposite ends a brake portion which is engageable in braking relation to a corresponding one of said driven pulleys, and control link means carried by said mower and operatively associating said idler pulley support arm with said brake member, said control link means being movable in accordance with movements of said idler pulley support arm to one or the other of said two alternative positions whereby to determine by its position whether said brake member is selectively in either nonbraking relation or in braking relation to both of said driven pulleys in accordance with whether said idler pulley is respectively in said tensioning relation or in said nontensioning relation to said drive belt.

2. A rotary mower as defined in claim 1 in which said brake member is mounted for pivotal movement about an axis extending substantially parallel to the plane of the upper surface of the mower deck.

3. A rotary mower as defined in claim 2 in which said brake member is an elongated rod-like member, said rod-like member including intermediate its length a crank-like portion to which said spring means is adapted to be attached, said rod-like member including at each of its opposite ends a generally "L" shaped portion, each L-shaped portion including an arm spaced from but extending generally parallel to the pivotal axis of said rod-like member, said arm of each respective L-shaped portion constituting said brake portion which is engageable in braking relation with a corresponding one of said driven pulleys.

4. A rotary mower as defined in claim 1 in which said idler pulley support arm is pivotally movable in a normally horizontal plane about a normally vertical axis.

5. A rotary mower as defined in claim 1 comprising spring means normally urging said brake member into braking engagement with both of said driven pulleys, said control link means being moved by said idler pulley support arm when said idler pulley is so positioned as to be in tensioning relation to said drive belt to cause said control link means to move said brake member against the force of said spring means to a nonbraking position relative to both of said driven pulleys, whereby to disable said brake member from brakingly engaging said driven pulleys; and in which when said idler pulley is so positioned as to be in nontensioning relation to said drive belt, said control link means is moved by said idler pulley support arm to a position in which said control link means is rendered ineffective to prevent movement of said brake member into braking engagement with both of said driven pulleys, and in which said spring means is effective to move said brake member into fully braking engagement simultaneously with both of said driven pulleys.

6. A rotary mower as defined in claim 5 in which said control link means is connected contiguous one of its ends to said idler pulley support arm whereby said control link means moves in accordance with the movement of said idler pulley support arm, said control link means being operatively associated with said brake member through a lost-motion connection whereby to insure that said brake member can move into fully braking position under the influence of said spring means relative to both of said driven pulleys when said idler pulley is so positioned as to be in nontensioning relation to said drive belt.

7. A rotary mower as defined in claim 6 in which said lost-motion connection comprises a slot in said control link means, and a portion of said brake member is received in said slot whereby to operatively associate said control link means and said brake member.

8. A rotary mower as defined in claim 5 in which when said idler pulley is in nontensioning relation to said drive belt said control link means is so positioned that said spring means is rendered effective to move said brake member into braking engagement with both of said driven pulleys, whereby the respective brake portions contiguous each of the opposite ends of said brake member engage said drive belt in its untensioned condition and force said drive belt into braking engagement with the respective driven pulleys, said brake portions being effective to rapidly stop any coasting movement of said drive belt in its untensioned condition and to rapidly stop any coasting of the respective driven pulleys.

9. A brake member for use with a rotary mower of the type comprising a mower deck, a pair of arbors mounted on said deck in spaced-apart relation to each other, a spindle supported for rotation by each of said arbors, a mower blade mounted on each of said spindles for rotation with the respective spindle in a plane beneath said mower deck, a driven pulley fixed to each spindle above said mower deck, drive belt driven from a suitable drive source, each of said driven pulleys being adapted to have said drive belt trained therearound, an idler pulley support arm supported for movement by said mower deck, an idler pulley carried by said idler pulley support arm, a clutch lever means carried by said mower and operatively associated with said idler pulley support arm, said clutch lever means being selectively movable to move said idler pulley support arm to one or the other of two alternative positions, whereby to selectively move said idler pulley into either tensioning or nontensioning relation to said drive belt and thus whereby to cause said drive belt to be selectively in driving or in nondriving relation to said driven pulleys, and a control link means carried by said mower and movable in accordance with movements of said idler pulley support arm, wherein the improvement comprises having said brake member common to both of said driven pulleys and supported by said mower in proximity to and extending between both of said driven pulleys, said brake member having contiguous each of its opposite ends a brake portion which is engageable in braking relation to a corresponding one of said driven pulleys, said brake member being adapted to be operatively associated with said idler pulley support arm by said control link means, whereby said brake member is selectively movable in accordance with the position of said control link means into either nonbraking relation or into braking relation to both of said driven pulleys in accordance with whether said idler pulley is respectively in said tensioning relation or in said nontensioning relation to said drive belt.

10. A brake member as defined in claim 9 in which said brake member is mounted for pivotal movement about a substantially horizontal axis.

11. A brake member as defined in claim 9 in which said brake member is an elongated rod-like member, said rod-like member including intermediate its length means to which a biasing spring means is adapted to be attached, said rod-like member including at each of its opposite ends a generally "L"-shaped portion, each L-shaped portion including an arm spaced from but extending generally parallel to the pivotal axis of said rod-like member, said arm of each respective L-shaped portion constituting said brake portion which is engageable in braking relation to a corresponding one of said driven pulleys.

12. A brake member for use with a rotary mower of the type comprising a mower deck, a pair of arbors mounted on said deck in spaced-apart relation to each other, a spindle supported for rotation by each of said arbors, a mower blade mounted on each of said spindles for rotation with the respective spindle in a plane beneath said mower deck, a driven pulley fixed to each spindle above said mower deck, a drive belt driven from a suitable drive source, each of said driven pulleys being adapted to have said drive belt trained therearound, means carried by said mower for causing said drive belt to be selectively either in tensioned or in nontensioned condition and thus whereby to cause said drive belt to be selectively either in driving or in nondriving relation to said driven pulleys, wherein the improvement comprises having said brake member common to both of said driven pulleys and supported by said mower in proximity to and extending between both of said driven pulleys, said brake member having contiguous each of its opposite ends a brake portion which is engageable in braking relation to a corresponding one of said driven pulleys, said brake portions being simultaneously engageable in braking relation each with its corresponding driven pulley, said brake member being adapted to be selectively moved into either nonbraking relation or into braking relation to both of said driven pulleys in accordance with whether said drive belt is respectively in said tensioned condition or in said nontensioned condition.

13. A brake member as defined in claim 12 in which said brake member is mounted for pivotal movement about an axis extending substantially parallel to the plane of the upper surface of the mower deck.

14. A brake member as defined in claim 12 in which said brake member is an elongated rod-like member, said rod-like member including intermediate its length means to which a biasing spring means is adapted to be attached, said rod-like member including at each of its opposite ends a generally "L"-shaped portion, each L-shaped portion including an arm spaced from but extending generally parallel to the pivotal axis of said rod-like member, said arm of each respective L-shaped portion constituting said brake portion which is engageable in braking relation with a corresponding one of said driven pulleys.

* * * * *